US 11,103,811 B2

(12) United States Patent
Gallop

(10) Patent No.: US 11,103,811 B2
(45) Date of Patent: Aug. 31, 2021

(54) MECHANICAL SEPARATION DEVICES

(71) Applicant: ICM, Inc., Colwich, KS (US)

(72) Inventor: Charles C. Gallop, Gower, MO (US)

(73) Assignee: ICM, Inc., Colwich, KS (US)

( * ) Notice: Subject to any disclaimer, the term of this patent is extended or adjusted under 35 U.S.C. 154(b) by 309 days.

(21) Appl. No.: 15/796,446

(22) Filed: Oct. 27, 2017

(65) Prior Publication Data
US 2018/0126302 A1    May 10, 2018

Related U.S. Application Data

(60) Provisional application No. 62/417,983, filed on Nov. 4, 2016.

(51) Int. Cl.
| B01D 29/01 | (2006.01) |
| B01D 39/10 | (2006.01) |
| B01D 29/78 | (2006.01) |
| B01D 29/54 | (2006.01) |
| B01D 29/86 | (2006.01) |
| B01D 29/23 | (2006.01) |
| B01D 29/64 | (2006.01) |

(52) U.S. Cl.
CPC ............. *B01D 29/01* (2013.01); *B01D 29/23* (2013.01); *B01D 29/54* (2013.01); *B01D 29/6476* (2013.01); *B01D 29/78* (2013.01); *B01D 29/86* (2013.01); *B01D 39/10* (2013.01); *B01D 2201/18* (2013.01)

(58) Field of Classification Search
CPC . B01D 2201/18; B01D 39/10; B01D 2311/04
See application file for complete search history.

(56) References Cited

U.S. PATENT DOCUMENTS

| 2,841,287 A | * | 7/1958 | Halbach | B01D 29/6415 |
| | | | | 210/414 |
| 3,725,262 A | * | 4/1973 | Mattice et al. | B03B 1/00 |
| | | | | 210/695 |
| 4,080,607 A | * | 3/1978 | Van Breemen | B41J 2/02 |
| | | | | 346/145 |
| 4,202,777 A | * | 5/1980 | Schall | B01D 35/28 |
| | | | | 210/405 |
| 5,950,840 A | * | 9/1999 | Thoma | B07B 1/12 |
| | | | | 209/314 |
| 6,113,780 A | * | 9/2000 | Buzanoski | B01D 29/01 |
| | | | | 210/171 |

(Continued)

FOREIGN PATENT DOCUMENTS

| AR | 115517 A1 | 1/2021 |
| BR | 102019011975 A2 | 12/2019 |
| CN | 110575570 A | 12/2019 |

OTHER PUBLICATIONS

Argentina Application Serial No. P170103057, Office Action dated Sep. 23, 2020, w/ English Translation, 7 pgs.

*Primary Examiner* — Ana M Fortuna
(74) *Attorney, Agent, or Firm* — Schwegman Lundberg & Woessner, P.A.

(57) ABSTRACT

Screen designs and screens for a mechanical separation device are disclosed for separating solids from liquids in a process stream. A screen may have a plurality of openings, which are conical shaped, having a diameter of about 1.0 mm to about 1.4 mm in size that are formed on a stainless steel sheet.

19 Claims, 9 Drawing Sheets

(56) References Cited

U.S. PATENT DOCUMENTS

| | | | | |
|---|---|---|---|---|
| 6,565,698 B1* | 5/2003 | Adams | ............... | B01D 29/012 |
| | | | | 156/290 |
| 9,376,504 B2 | 6/2016 | Dieker et al. | | |
| 9,718,006 B2 | 8/2017 | Lee et al. | | |
| 2005/0006284 A1* | 1/2005 | Zeller | ............... | E01H 12/00 |
| | | | | 209/404 |
| 2006/0008865 A1* | 1/2006 | Cote | ............... | B01D 35/027 |
| | | | | 435/34 |
| 2008/0217002 A1* | 9/2008 | Simonds | ............... | E21B 43/084 |
| | | | | 166/230 |
| 2008/0308478 A1* | 12/2008 | Stern | ............... | E04H 4/1218 |
| | | | | 210/167.1 |
| 2011/0111456 A1* | 5/2011 | Medoff | ............... | B01J 19/085 |
| | | | | 435/68.1 |
| 2012/0181237 A1* | 7/2012 | Winkler | ............... | B01D 33/067 |
| | | | | 210/437 |
| 2013/0048551 A1* | 2/2013 | Maxson | ............... | B01D 35/02 |
| | | | | 210/323.2 |
| 2014/0127772 A1 | 5/2014 | Kohl | | |
| 2015/0152371 A1 | 6/2015 | Gallop et al. | | |
| 2015/0343349 A1* | 12/2015 | Wells | ............... | B01D 29/52 |
| | | | | 210/232 |
| 2017/0145377 A1 | 5/2017 | Dieker et al. | | |
| 2017/0151520 A1* | 6/2017 | Tate | ............... | B01D 39/10 |
| 2017/0368555 A1* | 12/2017 | Franko | ............... | B01D 29/78 |
| 2019/0374883 A1 | 12/2019 | Gallop et al. | | |

\* cited by examiner

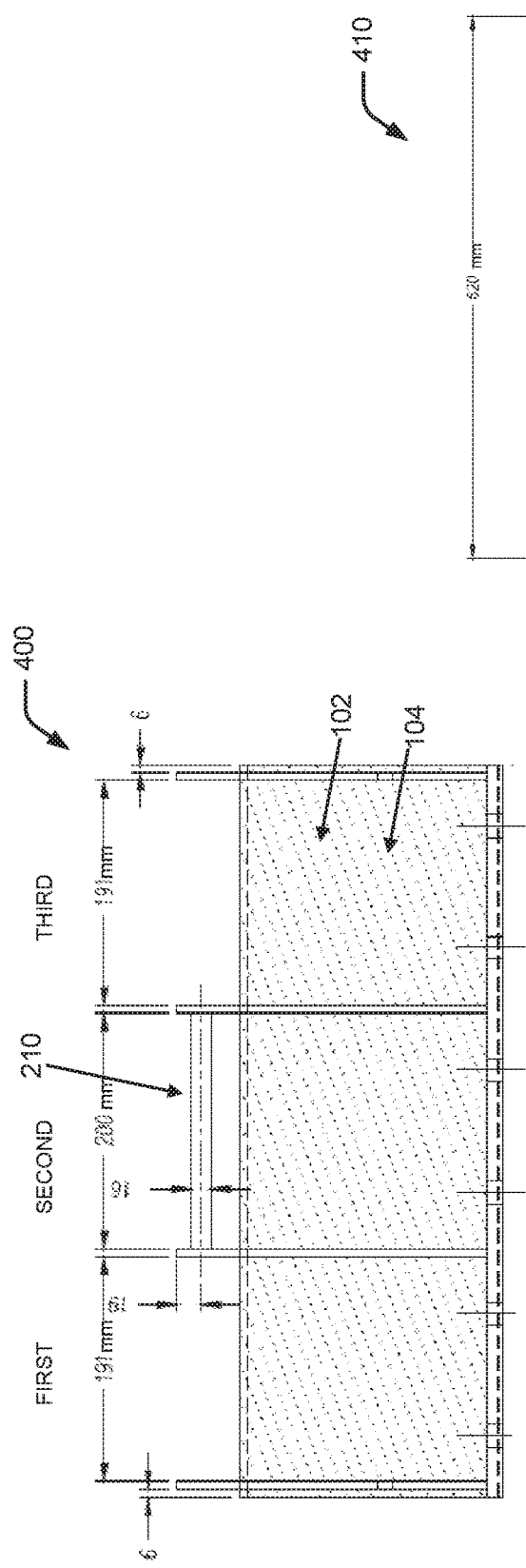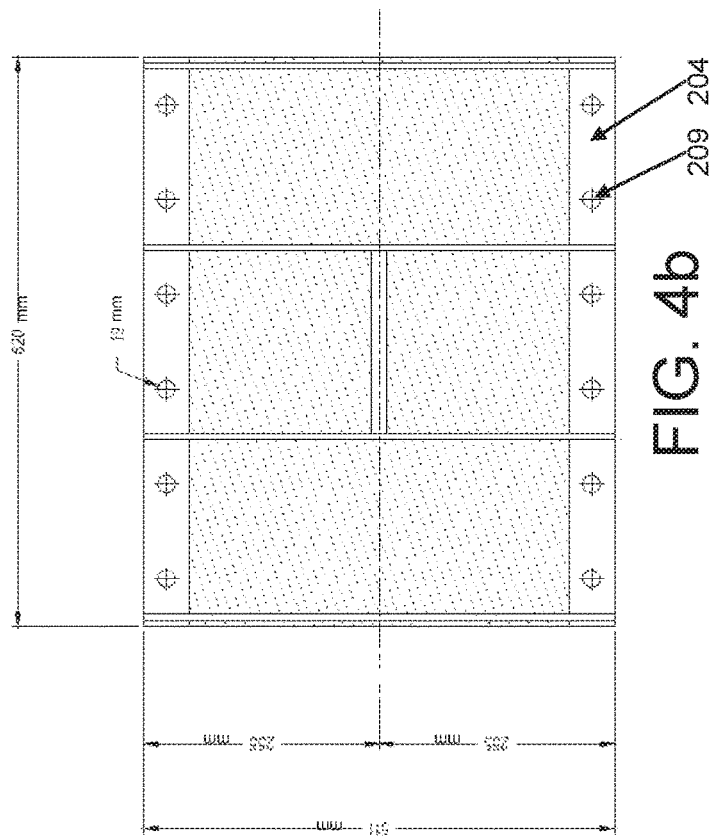
FIG. 4a
FIG. 4b

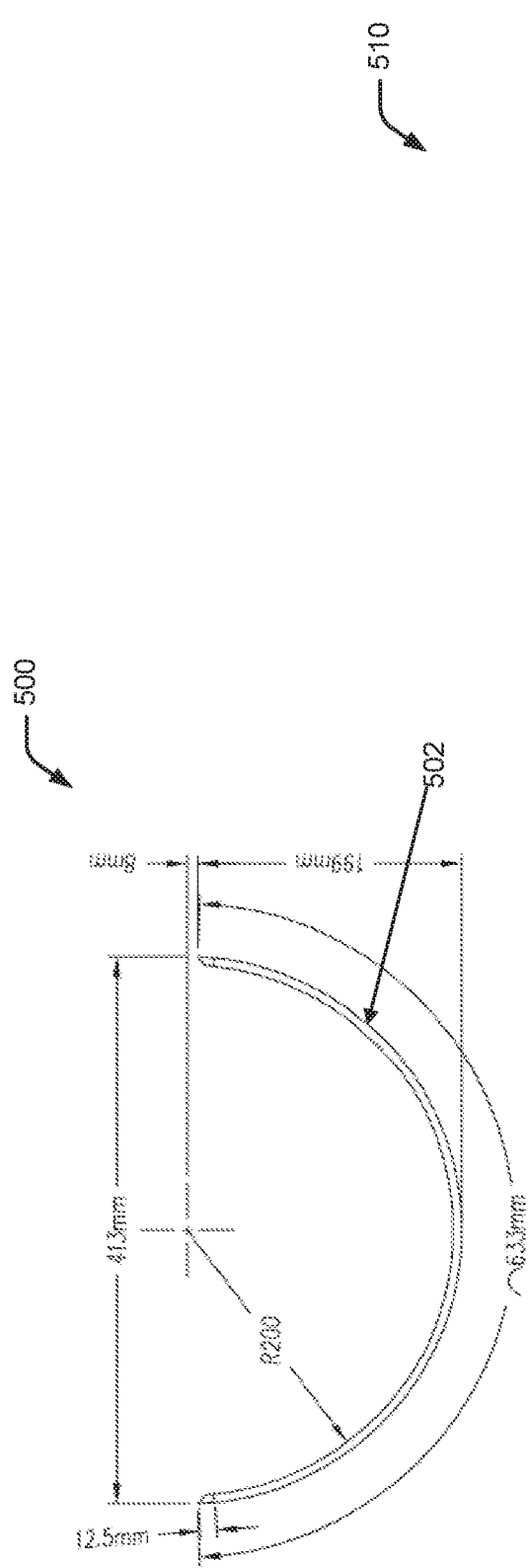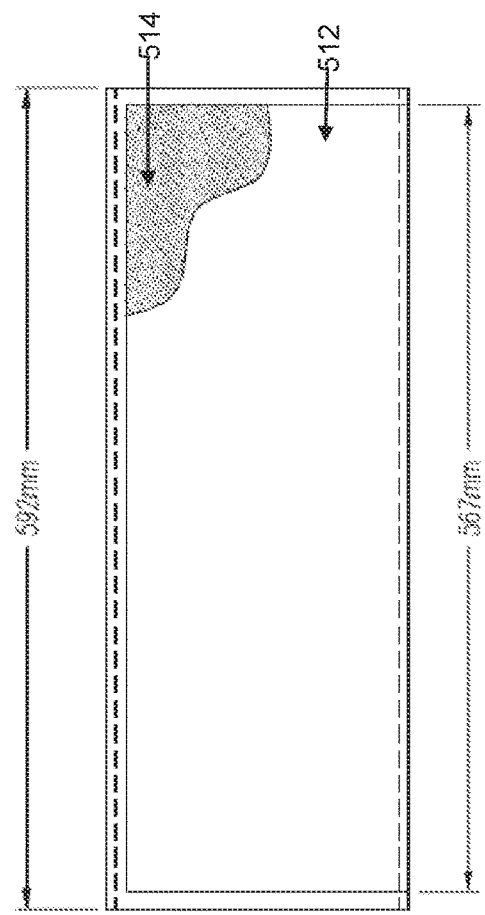
FIG. 5a
FIG. 5b

MECHANICAL SEPARATION DEVICES

CROSS REFERENCE TO RELATED APPLICATION

This application claims the benefit of priority to U.S. Provisional Application No. 62/417,983, entitled "Design Improvements for Mechanical Separation Devices," filed on Nov. 4, 2016, the content of which is hereby incorporated by reference in its entirety.

TECHNICAL FIELD

The subject matter of this disclosure relates to improving efficiencies of mechanical separation devices, which are used to separate components in a process stream. In particular, the subject matter is directed to design improvements for the mechanical separation devices to separate solids from a process stream in a more efficient manner, to improve life of the equipment based on the design improvements, and to increase overall efficiency of a plant.

BACKGROUND

A wide range of industrial applications require materials to be separated into several components through, for example, some type of filtration process utilizing a liquid medium. Once filtered, the separated component, and/or the remainder of solid material and liquid medium, may be further processed so as to result in one or more desired products. By way of example, various methods of producing alcohol from grain may require fibrous component of the grain be separated from starch and/or other components of the grain.

There are two known corn processes to produce ethanol, a corn wet milling process and a dry grind milling process. A corn wet milling process, for example, separates the fiber from the starch in corn and subsequently uses the starch to produce ethanol, which may be used in automobiles or other motor vehicles. A dry grind milling process, for example, also separates the fiber or insoluble solids ("wet cake"), from the liquid in a process stream, or "thin stillage" from the residuals, i.e., "whole stillage", produced from distillation. In most cases, the fiber is subsequently used to produce distillers grains for animal feed, such as cattle, pigs, and chickens.

In a corn process, the corn feedstock is mixed with water to form a slurry having a relatively high percentage of water (e.g., 60% or higher). The process may separate the fiber from the slurry, which in addition to the water, contains, for example, starch and other components of the corn, and the slurry is further processed to produce ethanol. Conventional devices used for separation may include pressure screen devices, gravity screen devices, centrifuges, and other separation type devices.

The pressure screen devices will separate larger particles out of a process stream under "pressure." For instance, the pressure screen devices may use a rotating screw to direct the slurry to flow through a static screen under relatively low fluid pressure. The screen includes openings sufficiently sized, to permit water, starch and any other components smaller than the openings, to flow through the screen. The screen prevents the fiber from flowing through, thus essentially filtering the fiber from the slurry. However, the pressure screen devices have efficiency problems by limiting flow rates and by requiring a thick influent (entering stream) to be efficient. Liquids have a high solids content.

The gravity screen devices direct the process stream through a static screen under gravity action. Separation efficiency occurs based on a screen opening size to prevent large size particles from passing through the screen opening. However, the gravity screen devices have efficiency problems with long residence times on the screen to maximize separation efficiency and that the components have a difference in gravity. Solids have a high moisture content.

A centrifuge may be used to separate and to recover various components. Problems are that the centrifuge may not separate components, based on density differential and may not adequately separate solids from liquids in the process streams, is expensive to purchase and to operate, requires frequent maintenance and repair, and requires a higher skill set to operate and to maintain. Also, the solids have high moisture content, which drives up operating costs to transport and to dry the solids downstream. In addition, these pieces of equipment create emissions from the plants.

Other separation type devices may use a wedge wire screen or filter to separate the components. However, the components tend to become clogged or plugged in the wedge wire screen. Furthermore, the wedge wire screen has premature and/or abrasive wear, and is relatively easy to break. These problems with the wedge wire screen create down time at plants to have to change the wedge wire screens, as well as increased operating costs. Furthermore, the wedge wire screens do not remove flat shape particles very well and are expensive.

Accordingly, there is a need for improved designs on mechanical separation devices to improve separation efficiencies, to improve throughput, to reduce capital costs, and to reduce shutdown time at plants.

SUMMARY

This disclosure is directed to improved screen designs, screens and a bar handle for mechanical separation devices for separating solids from liquids in a process stream. This disclosure helps to reduce an amount of energy used for processing, which in turn reduces greenhouse gas emissions or carbon emissions, and reduce operating costs and/or reduce capital costs.

In an embodiment, a screen design to separate solids from liquids. The screen design has a plurality of openings formed on a sheet of materials, wherein each opening in the plurality of openings has a diameter of about 0.8 to 1.5 mm in size. The screen design with the plurality of openings is used in a mechanical separation device in a process that receives a mixture of liquids and solids, and separates out the solids from the liquids.

In another embodiment, a screen separates solids from liquids, the screen has a plurality of openings formed on a sheet of material. Each opening in the plurality of openings has a diameter of about 0.8 to about 2.0 mm in size. The plurality of openings includes a geometric shape of a circle for each opening on the sheet of material. The screen having the plurality of openings is used in a mechanical separation device in a process that receives a mixture of liquids and solids, and separates out the solids from the mixture of liquids and solids.

In yet another embodiment, a screen has a plurality of openings formed on a sheet of material. The opening in each plurality of openings is about 0.8 to 1.4 mm in size. The sheet of material is stainless steel. The screen with plurality of openings is used in a mechanical separation device to separate out solids from liquids.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other aspects and advantages of the claimed subject matter will be apparent from the following Detailed Description of the embodiments and the accompanying figures.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. The features illustrated in the figures are not necessarily drawn to scale, and features of one embodiment may be employed with other embodiments as the skilled artisan would recognize, even if not explicitly stated herein. The accompanying drawings illustrate example embodiments of the subject matter and, with a detailed description of the embodiments given below, serve to explain the principles of the subject matter.

FIG. 4a illustrates an elevation view example of the screen design for a mechanical separation device.

FIG. 4b illustrates a plan view example of the screen design for a mechanical separation device.

FIG. 5a illustrates a profile view example of another screen design for a mechanical separation device.

FIG. 5b illustrates an elevation view example of another screen design for a mechanical separation device.

DETAILED DESCRIPTION

The Detailed Description describes embodiments of the subject matter and the various features and advantageous details thereof are explained more fully with reference to non-limiting embodiments and examples that are illustrated in the accompanying figures and detailed in the following description. Descriptions of well-known components and processing techniques may be omitted so as to not unnecessarily obscure the embodiments of the subject matter. The examples used herein are intended merely to facilitate an understanding of ways in which the subject matter may be practiced and to further enable those of skill in the art to practice the embodiments of the subject matter. Accordingly, the examples, the embodiments, and the figures herein should not be construed as limiting the scope of the subject matter.

This disclosure describes examples of design improvements for a mechanical separation device by separating components, solids from liquids, in a process stream obtained from a production facility. For instance, the production facility may include, but is not limited to, biofuels, alcohol, animal feed, oil, biodiesel, pulp and paper, textile, chemical industry, and other fields. In an example, the process separates the solids from the process stream before fermentation, which will direct the solids to bypass fermentation. In another example, the process separates the solids from the process stream after fermentation, which will create a drier product and cleaner liquid stream for further processing. The improved designs improve separation efficiencies, which will reduce the operating costs as well as reduce energy usage for downstream processing.

The majority of the fuel ethanol in the United States is produced from the wet milling process or the dry grind milling process. Any type and quality of grain can be used to produce ethanol, the feedstock for these processes may be a corn known as "No. 2 Yellow Dent Corn." The "No. 2" refers to a quality of corn having certain characteristics as defined by the National Grain Inspection Association, as is known in the art. "Yellow Dent" refers to a specific type of corn as is known in the art. Sorghum grain is also utilized to a very small extent. The current industry average for ethanol yield for both dry grind and wet mill plants is approximately 10.2 liters (approximately 2.7 gallons) of ethanol produced per 25.4 kg (one (1) bushel) of No. 2 Yellow Dent Corn. Embodiments of the design improvements are used for illustration purposes in the wet milling process and the dry grind milling process. The design improvements may be implemented in the different fields as discussed above.

Figure 1:
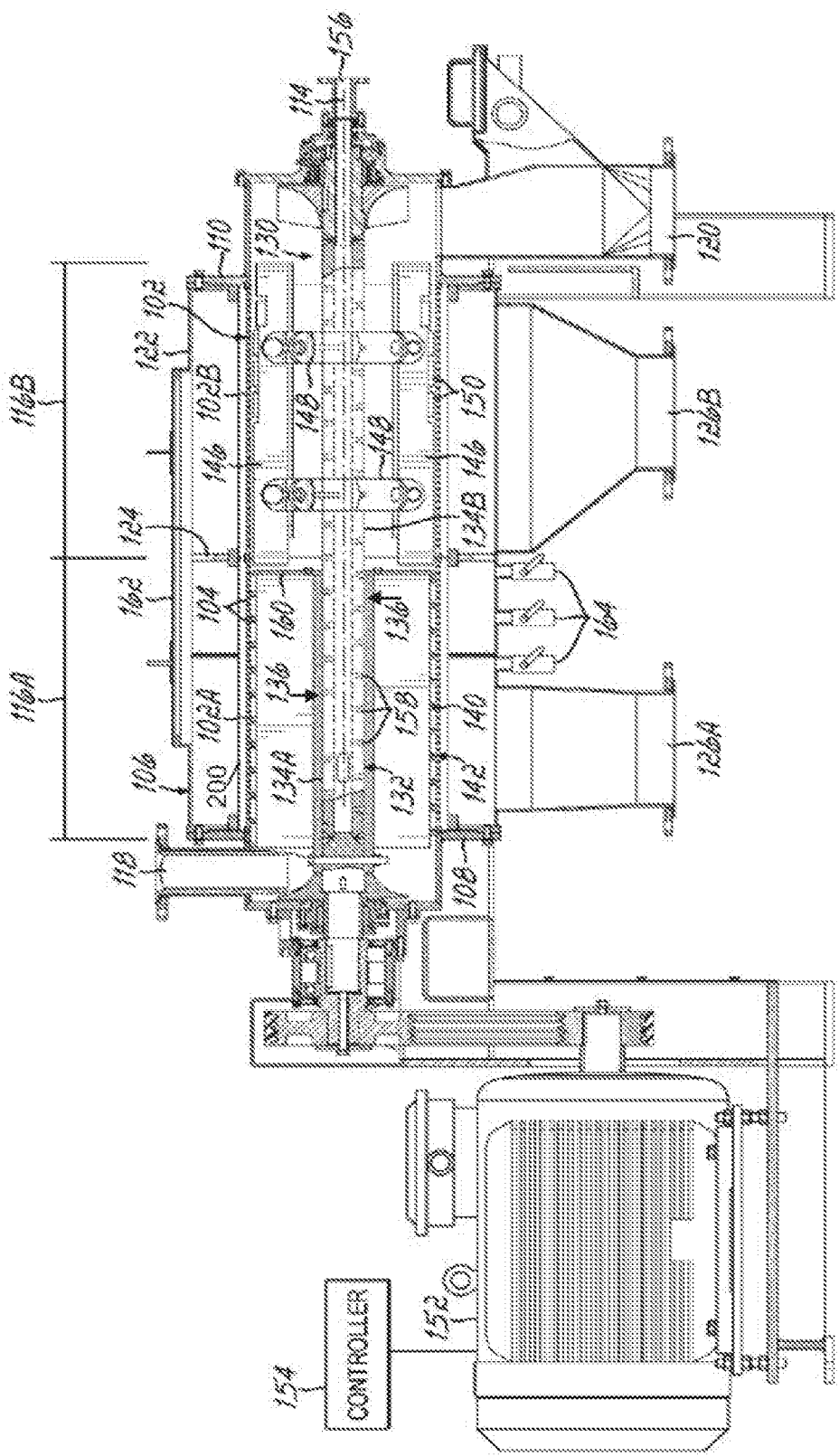
FIG. 1 is a cross-sectional view of a mechanical separation device with screen, handle, and flinger design improvements.

Turning to FIG. 1, an apparatus 100 is a single, self-contained device configured for pre-washing and separating, filtering a material, fiber from a liquid medium, then further washing/de-watering the material. For the wet milling process, the apparatus 100 can perform both the initial filtering of the slurry and pre-washing of the fiber to clean the fiber and to remove starch/gluten that is associated with the fiber, as well as washing/dewatering of the fiber. For the dry grind milling process, the apparatus 100 also can perform both an initial filtering and pre-washing of the fiber to clean the fiber, gluten, and fat; and to remove the starch that is associated with the fiber, as well as washing/dewatering of the fiber, gluten, and fat.

The apparatus 100 includes a stationary, cylindrical-shaped screen 102, 200 having a plurality of openings 104 formed therein to permit the liquid medium, including any wash water and any starch and/or gluten and/or fine suspended particles (including yeast from fermentation) washed off the fiber, to pass through the screen 102, 200 while preventing the larger sized material, such as fiber from passing through. The screens 102, 200 are disposed in an interior of an elongated housing 106, which includes a first end wall 108 and a second end wall 110. The screen 102, 200 is situated about a central axis 114 of the apparatus 100 and extends substantially along the length (L) thereof. The improved designs with the plurality of openings on the screen 102, 200 are discussed in detail with references to FIGS. 2-5.

Although a single or a unitary elongated screen may be utilized here, the screen 102, 200 is shown having individual first and second screen sections 102A and 102B, which are situated adjacent one another along a length of the screen 102, 200 to generally correspond respectively with first and second zones 116A and 116B of the housing 106. The first screen section 102A is located proximate a tangential feed inlet 118 located at one end of the apparatus 100 adjacent the first zone 116A to receive the incoming material and liquid medium and extends partly along the length (L) of the apparatus 100 to about a midway point thereof. The second screen section 102B is situated adjacent the first screen section 102A at about the midway point and extends partly along the remainder of the length (L) of the apparatus 100 to proximate a fiber discharge chute 120, which is situated at an opposing end of the apparatus 100 adjacent the second zone 116B.

The lengths of the first and second screen sections 102A, 102B may vary but, due to the overall length, a large volume of liquid medium and material can be processed while still producing a desirably dry material. For example, the first or second screen section 102A, 102B may extend less than or more than about the midway point of the apparatus 100. Also, while only two screen sections 102A, 102B are used here, it is understood that more than two screen sections may be utilized. In addition, while the diameter of the screen 102, 200 is shown as being substantially constant along its length, the screen diameter may vary along at least one or more portions thereof. In one example, the apparatus 100 may have a screen length to screen diameter (L/D) ratio greater than 3. In another example, the L/D screen ratio is between approximately 3 and 10, and more preferably between 4 and 6. These values are exemplary and those of ordinary skill in the art will recognize other ratios suitable for a particular application.

The housing 106 generally surrounds the screen 102, 200 and collects the liquid medium that passes through the plurality of openings 104 in the screen 102, 200. The housing 106 includes at least one side wall 122 connecting the first and second end walls 108, 110 to define the interior. The housing 106 further includes at least one interior panel 124 that compartmentalizes and separates the housing 106 into the first and second zones 116A, 116B, which include first and second hoppers 126A and 126B, respectively, with corresponding outlets to remove the filtered liquid medium and direct the filtered liquid medium to a desired location. The first and second zones 116A, 116B are situated adjacent one another.

The first zone 116A may generally define an initial pre-washing and separation zone, and the second zone 116B may generally define a washing/dewatering zone. The end of the second zone 116B includes a discharge chute 120 where the separated and washed/de-watered fiber material may be collected for further processing. Although two zones 116A, 116B are illustrated here, those of ordinary skill in the art will appreciate that the number of separation zones 116A and the number of washing/dewatering zones 116B may be application specific, i.e., may vary in number as well as in length. For example, the first or second zone 116A, 116B may extend less than or more than about the midway point of the apparatus 100. The housing 106 may have any suitable shape. If more than two zones are desired, e.g., three zones, the housing 106 is simply adapted to include an additional interior panel 124 to further compartmentalize the housing into first and second zones 116A, 1163 and a third zone (not shown), which can include first and second hoppers 126A, 126B and a third hopper (not shown), respectively, with corresponding outlets for removing the filtered liquid medium and directing the filtered liquid medium to a desired location. In one example, the interior panel 124 is movable or adjustable, e.g., slidably adjustable, generally along the length (L) of the apparatus to vary or control the size of the zones 116A, 116B.

The tangential feed inlet 118 is at one end of the apparatus 100, which is adjacent to the first zone 116A and in fluid communication with an interior of the first screen section 102A that corresponds with the first zone 116A of the housing 106. The feed inlet 118 supplies the liquid medium and material, e.g., fiber, to the apparatus 100 and can introduce the liquid medium and material in a swirling fashion (tangential entry along outside wall) to start filtering the fiber upon entry into the apparatus 100.

A conveyor 130 is disposed or situated lengthwise within the screen 102, 200 for moving the material along the length (L) of the apparatus 100 from the feed inlet 118 towards the discharge chute 120. The conveyor 130 rotates relative to the stationary screen 102, 200 and to the central axis 114 to direct the liquid medium and material toward the screen 102, 200 to filter the material from the liquid medium.

The conveyor 130 includes a rotatable shaft 132 that extends along the length (L) of the apparatus 100 and is situated about the central axis 114. The shaft 132 defines a first conveyor section 134A that generally corresponds with the first zone 116A and includes a plurality of spaced apart vanes 136, which extend generally horizontally along substantially the length of the first zone 116A.

In an embodiment, at least one ribbon flight 140 is helically wound about and secured to the outer surfaces of the vanes 136, which occupies an area between the outer surface of the vanes 136 and the first screen section 102A. The ribbon flight 140, can be continuous or discontinuous, helically winds substantially about and along the length of the vanes 136, which together define an auger 142 for moving the material and liquid medium radially towards and along the length of the first screen section 102A, and in a direction towards the second screen section 102B and the discharge outlet 120, to help pre-wash and separate the material from the liquid medium. The ribbon flight 140 includes an outer edge configured to be located in close proximity to the inner surface of the first screen section 102A. For example, a small gap (on the order of 0.3 mm-2.0 mm) may exist between the outer edge of the ribbon flight 140 and the first screen section 102A so as to accommodate, for example, relative movement between, yet remain effective for keeping the filtration area at the first screen section clean 102A. The thickness of the flight 140 can be from about 1 mm to about 30 mm, but can vary as desired. In another example, the thickness of the flight 140 can be from about 3 mm to about 10 mm. The thickness may vary along the length of the flight 140. The height of the flight 140 can be from about 1 mm to about 5 cm, but can vary as desired. The height may vary along the length of the flight 140.

In one embodiment, the auger 142 may have a multi-flight configuration (e.g., having multiple helical ribbon flights extending along at least a portion of the length thereof), which may enhance the filtering of the material from the liquid medium while preventing the screen 102 from plugging. Those of ordinary skill in the art will recognize other configurations that facilitate the movement of the material through the apparatus 100 to meet the requirements of a particular application, and the subject matter is not limited to the particular configuration shown in FIG. 1. Another design variable that allows the auger 142 for specific applications is the pitch of the ribbon flight 140 along the length of the vanes 136. In one embodiment, for example, the pitch may vary along the length.

The shaft 132 of the conveyor 130 further defines a second conveyor section 134B adjacent the first conveyor section 134A and that generally corresponds with the second zone 116B. This second conveyor section 134B includes a plurality of paddles 146 that extend adjacently parallel to the second screen section 102B and generally along the length thereof. Each paddle 146 is connected to the shaft 132 via a plurality of spaced apart support arms 148.

The length of each paddle 146 may be adjusted, as desired. The number of paddles 146 can range from about 2 to about 10. In another example, the number of paddles 146 is from about 2 to about 8. In yet another example, the number of paddles 146 is 8. The paddles 146 help move the material and liquid medium radially towards and along the length of the second screen section 102B, as well as towards the discharge outlet 120, so as to further separate and dry the material. The spacing between the paddles 146 may be constant or variable from one paddle 146 to the next.

Each paddle 146 can optionally include one or more flingers, which may define individual triangular segments located near one end of the paddle 146. One or more flingers may be angled or configured to help push the fiber towards the discharge chute 120. In one example, the number of flingers can range from about 2 to about 12. The number of flingers and paddles 146 can be modified depending on the amount of solids in the feed, for example. The gap between the screen 102 and the paddle 146 can range from about 0.25 to about 0.65 inch (0.64 to 1.65 cm). A smaller gap gives a drier cake with higher capacity and purer fiber. A larger gap gives a wetter cake with lower capacity and purer protein stream in slurry passing through screen openings, for example. These designs help facilitate the movement of the material through the apparatus 100 to meet the requirements of a particular application, and the invention is not limited to the particular configuration shown in FIG. 1. The plurality of the flingers designed to improve moving the material and the liquid medium through the mechanical separation device is discussed in detail with references to FIGS. 6-8.

Also, with additional zones, i.e., more than two zones (not shown), it is contemplated that either the auger 142 or the plurality of paddles 146 connected to the shaft 132 via a plurality of spaced apart support arms 148, or the like, may be provided as desired for additional filtering/separation of the material from the liquid medium. In addition, the desired length of the first and second conveyor sections 134A, 134B can be varied or dependent upon the feed rate of the liquid medium and material and/or the composition thereof.

With further reference to FIG. 1, a motor 152 is operatively coupled to the conveyor 130 for rotation of the shaft 132 about the central axis 114. A controller, shown schematically at 154, can be operatively coupled to the motor 152 for controlling the rotational speed of the conveyor 130, which may be constant or variable. Rotation of the shaft 132 may be achieved by a suitable motor 152 or other motive force-generating device, as understood in the art. For example, one end of the shaft 132 may be operatively coupled to an electric motor, such as via a suitable belt or by direct drive, so as to cause the shaft 132 to rotate about the central axis 114. In one embodiment, the controller 154 may be a computer, which can control the rotational speed of the shaft 132. Such a controller 154 is generally known to those of ordinary skill in the art. The rotational speed of the shaft 132 may be selectively varied depending on the specific application. In one embodiment, the shaft 132 may be rotated at a speed (e.g., revolutions per minute) that can range from about 100 to about 2000 RPM (about 1.67 to about 33.33 hertz). In another example, the speed can range from about 400 to about 1000 RPM (about 6.67 to about 16.67 hertz). In another example, the speed can range from about 500 to about 900 RPM (about 8.33 to about 15 hertz). A higher speed provides higher capacity but consumes more power. Those of ordinary skill in the art will recognize that these values are exemplary and the speeds may be selected and optimized to meet the needs of a particular application.

The shaft 132 of the conveyor 130 further includes an optional liquid inlet 156 that is centrally situated within and extends substantially along the length of the shaft 132. The liquid inlet 156 is adapted to receive wash water through from a desired source. The shaft 132 also has a plurality of liquid outlets 158 associated with the liquid inlet 156 and are spaced apart along substantially the length of the shaft 132 within the first and second zones 116A, 116B for introducing wash water therein. If additional zones are desired in apparatus 100, the liquid inlet 156 may be configured to provide wash water thereto as well. One or more of the outlets 158 may be controlled or eliminated altogether to prevent or reduce the amount of wash water entering into any one zone 116A, 116B. Additionally, a counter-current washing technique may be employed to save wash water usage. With the optional addition of wash water to the apparatus 100, displacement washing can be achieved instead of dilution washing. And as the fiber material dries, wash water may be added, yet, the apparatus 100 still produces a dry material prior to the discharge chute 120.

In one example, the second zone 116B is not subjected to wash water to generally define a press/dewatering zone, as compared to a washing/dewatering zone, for dewatering the fiber material. In another example, neither the first nor second zones 116A, 116B receive additional wash water and generally define a first separation or filtration zone and a second press/dewatering zone, respectively, as compared to a pre-wash/separation zone and a washing/dewatering zone. In this example, the filtrate from the filtration zone may have less solids, with more solids consequently being present in the filtrate from press/dewatering zone. In addition, the separated filtrate from the filtration zone can be optionally returned to the feed inlet 118 to ultimately yield a more desirable filtrate and dry fiber. If additional zones are desired in the apparatus 100, various configurations are contemplated. For example, with a three zone apparatus (not shown) where neither the first nor second zones receive additional wash water, a third zone (not shown) may define a washing/dewatering zone, which includes the additional wash water. In a further example, an optional fourth zone (not shown) may be provided, which excludes additional wash water, to define another press/dewatering zone.

With reference again to FIG. 1, the conveyor arrangement allows for pre-washing and filtering, as well as gentle (low turbulence) dewatering in the first zone 116A, which can be desirable for avoiding emulsions and forcing oversized particles through the screen 102. The paddles 146 in the second zone 116B do a desirable job of further, more strongly dewatering the fiber to produce a drier fiber for maximum liquid medium recovery from the fiber material. It is anticipated that the fiber material that exits the apparatus 100 via the discharge chute 120 may be between approximately 55% and approximately 85% water. This water concentration range represents a significant improvement over conventional systems, which typically provide fiber material at about 85% to about 95% water. In addition, if oil recovery is desired from the liquid medium, a desirable clean oil may be produced in the first zone 116A, which can be separated out using known technique, with more of an oil emulsion being produced in the second zone 116B, which can be later broken up using known techniques.

The apparatus 100 further includes at least one optional baffle 160 that is circumferentially disposed about and secured to the shaft 132 at about the junction between the first and second zones 116A, 116B. Here, the baffle 160 is specifically situated adjacent the end of the auger 142 and the beginning of the paddles 146. The baffle 160 extends in a direction away from the shaft 132, is generally perpendicular to the screen 102, and includes an outer surface that is spaced apart therefrom. The gap between the baffle 160 and the screen 102 can be adjusted, as desired. In one example, the gap can range from about ⅛ (0.32 cm) inch to about 1 inch (2.54 cm). The baffle 160 helps to control compaction in the first zone 116A and the amount of liquid medium that can be moved from the first to the second zone 116A, 116B, despite the size of the openings 104 in the screen 102. It is contemplated that with three or more zones, additional baffles 160 may be circumferentially disposed about and secured to the shaft 132 at about the junction between the additional zone and its adjacent zone. For example, in a three zone arrangement (not shown), baffles 160 could be situated between the first and second zones 116A, 116B and between the second zone 116B and third zone, with the second zone 116B being situated intermediate the first zone 116A and third zone.

With further reference to FIG. 1, at least one removable access panel 162, which is situated on the top side of the side wall 122 of the housing 106, may be provided for accessing the interior of the apparatus 100. In addition, one or more external valves 164 may be situated on the underside of the side wall 122 of the housing 106 so that the filtered liquid medium from the first zone 116A, for example, may be obtained and analyzed/tested, such as for starch and protein concentrations.

The apparatus 100 may have a length to diameter (L/D) ratio greater than two. In one embodiment, the apparatus 100 may have a L/D ratio between approximately 2 and 10, and more preferably between 4 and 6. These values are exemplary and those of ordinary skill in the art will recognize other ratios suitable for a particular application.

Operation of the apparatus 100 will now be described. To facilitate understanding of various aspects of the invention, operation of the apparatus 100 will be described in the context of fiber filtration in a corn mill process. It should be appreciated, however, that the apparatus 100 may be used in a wide range of applications, including grain wet or dry mills, and is not limited in use either the corn wet mill or dry mill process described herein.

With reference again to FIG. 1, the motor 152 is activated to initiate rotation of the shaft 132 at its designated speed, as described above. The slurry is supplied to the tangential feed inlet 118 to flow into the interior of the screen 102 of the first screen section 102A that generally corresponds with the first zone 116A and which includes the auger 142. In one example, the linear velocity at which the liquid medium and material is introduced into the apparatus 100 can be the same, or close to the same, as the tangential linear velocity of the first conveyor section 134A, e.g., the auger 142, at the surface of the first screen section 102A so as to conserve on power consumption and maximize separation of the liquid medium and material. To help control the linear velocity at which the liquid medium and material is introduced into the apparatus 100, the feed inlet 118 or a portion thereof can be tailored to, or may be adjustable, so that the feed inlet 118 or a portion thereof has a desired shape or size, e.g., diameter. The desired size or shape of the feed inlet 118, such as the size of the opening, for example, can be dependent upon the feed rate and/or feed pressure of the liquid medium and material.

The concavity of the end of the shaft 132 adjacent the opening of the feed inlet 118 helps direct the slurry into the apparatus 100 between the auger 142 and first screen section 102A and the open cavities between the vanes 136, as wash water is also directed therein via the outlets 158 on the shaft 132. The wash water effectively pre-washes the fiber. Due to the rotation of the shaft 132 and, thus, the vanes 136 and the accompanying ribbon flight 140, the slurry is directed radially toward the first screen section 102A, which corresponds with the first zone 116A, to filter the material from the liquid medium as well as moved along the length of the first screen section 102A. Fiber is filtered from the slurry by allowing the water, starch, gluten, fat or oil and other relatively small components of the slurry to pass through the first screen section 102A and drain into the first hopper 126A, which is situated in the first zone 116A, while the fiber and relatively large components of the slurry are retained in the apparatus 100.

The fiber eventually pushes its way through the gap between the baffle 160 and the first screen section 102A and into the interior of the second screen section 102B, which corresponds with the second zone 116B, for washing/dewatering via the paddles 146. Here, wash water may be directed therein via the outlets 158 on the shaft 132. Due to the rotation of the paddles 146, the fiber is directed radially towards the second screen section 102B, which corresponds with the second zone 116B, as well as moved along the length of the second screen section 102B so that the fiber is further dewatered and filtered from the liquid medium. This process allows any additional water, starch, gluten, and other relatively small components of the slurry to pass through the second screen section 102B and drain into the second hopper 126B situated in the second zone 116B, while the fiber makes its way towards the discharge chute 120. The concavity of the end of the shaft 132 adjacent the discharge chute 120 helps direct the de-watered fiber therein. At the end of second zone 116B, the fiber has been sufficiently concentrated. For example, in one embodiment, the fiber may be between about 55% and about 80% water at the end of the second zone 116B.

The washed and filtered fiber exits via the discharge chute 120. When the fiber exits the chute 120, the fiber may be transported to a remote site and further processed to result in a desired product. Moreover, the slurry that passes through the screen 102, as well any wash water, starch and/or gluten, may also be further processed, such as according to the corn wet milling process as described above in FIG. 1.

The various features of the apparatus 100 culminate in a synergistic effect. For example, one or more of the features allow the apparatus 100 to be a single, self-contained device that performs both the initial pre-washing of the fiber and filtering of the liquid medium to remove the desired filtered material, and additional washing/dewatering of the material to remove additional components, such as additional starch and/or gluten, therefrom. The present apparatus 100 can also reduce the capital costs of the device, the labor and associated costs for maintaining the device, and the operating costs (e.g., use less water, etc.

One or more of the features of the apparatus 100 also allow the dewatered material to exit a centrifuge in a drier condition as compared to existing filtration systems. For example, the apparatus 100 may provide the filtered material at a water concentration of between about 55% and about 80% water, which can be a significant reduction compared to conventional filtration systems. Providing a drier product results in less wash water required for a given purity level of fiber. Also, a drier product may result in additional benefits. For example, in many cases, in the corn wet milling process, the fiber collected in filtration systems are further processed by directing the fiber through a press to squeeze additional water from the fiber, and then directing the fiber through a dryer. The various apparatuses that press the fiber are expensive and costly to maintain and operate. Additionally, energy costs associated with operation of the dryer are also expensive.

While the subject matter has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art.

In other embodiments, the first conveyor section 134A can include the plurality of paddles 146 connected to the shaft 132 via a plurality of spaced apart support arms 148 and the second conveyor section 134B can include the auger 142. In yet another embodiment, both the first conveyor section 134A and second conveyor section 134B can include the plurality of paddles 146 connected to the shaft 132 via a plurality of spaced apart support arms 148. In one example, the openings 104 in the first screen section 102A may be larger here than the openings in the second screen section 102B. In still another embodiment, both the first conveyor section 134A and second conveyor section 134B can include the auger 142. In one example, the openings 104 in the first screen section 102A may be larger here than the openings in the second screen section 102B. In addition, although not shown, in one example, the first and second conveyor sections 134A, 134B can define a single elongated auger or a plurality of paddles extending generally along the length of the apparatus 100 to generally correspond with the first and second zones 116A, 116B. And other various combinations and arrangements are contemplated where more than the two zones 116A, 116B are provided.

In addition, while the apparatus 100 has been described herein as being in a generally horizontal orientation, other orientations are possible, including the apparatus 100 having a generally vertical orientation. Additionally, the apparatus 100 may be an open type of system and may also be designed for pressurized operation. Still further, the apparatus 100 may be operated continuously or configured to work in a batch mode of operation. Furthermore, those of ordinary skill in the art should recognize that the number of zones may be selected based on the specific application.

In addition to the above, the apparatus 100 as described above may be found beneficial in other industrial applications. By way of example, the chemical industry utilizes a crystal formation process wherein it is desirable to bring in a bulk material, separate out the crystals contained therein, and then wash the crystals. The apparatus 100 as described herein may be used for such a process to achieve the results in a single device. Moreover, the juice industry similarly includes various processes wherein a bulk material is brought in and filtered. It may be desirable to wash the fruit or other bulk material as well. Again, the apparatus 100 as described herein may be used in such applications. Moreover, other corn or grain milling processes may benefit from filtration disclosed herein. Additionally, other industries that seek to filter a material from a medium (e.g., liquid medium or otherwise) and/or wash the material may also benefit from the screening apparatus as described herein.

The apparatus 100 described herein may also provide benefits to industries that utilize other types of filtration systems. For examples, some industries utilize decanter centrifuges and/or conic screen bowl centrifuges. Nevertheless, these centrifuges also have drawbacks which may be addressed by the apparatus 100 disclosed herein. Typically, for example, decanter centrifuges have no washing zone and therefore separate devices must be used if washing the filtered material is desired. Of course these additional devices are costly and take up space within the manufacturing facility. Additionally, the apparatus 100 described herein are able to provide a filtered material in a drier state as compared to the output of a decanter centrifuge. As noted above, providing a drier material may significantly reduce the energy costs associated with post processing of the material. Similarly, conic screen bowl centrifuges do not provide for washing of the filtered material.

The mechanical separation device may include but is not limited to the apparatus as shown in FIG. 1, such as a multi-zoned screening apparatus, a paddle screen, and the like. Typically, paddle screens are mechanical devices that separate components with a wedge wire. The screen designs, bar designs and bar handle in this application are improvements to the mechanical separation device to help separate the components in a more efficient manner, to improve throughput, to reduce capital costs and to reduce shutdown time at plants. These new designs in this application offer a variety of improvements along with reducing carbon footprint, as the plants implementing these new designs on mechanical separation devices will operate more efficiently, run smother, experience less stops and starts (downtime), and require maintenance.

Screen Designs

Figure 2:
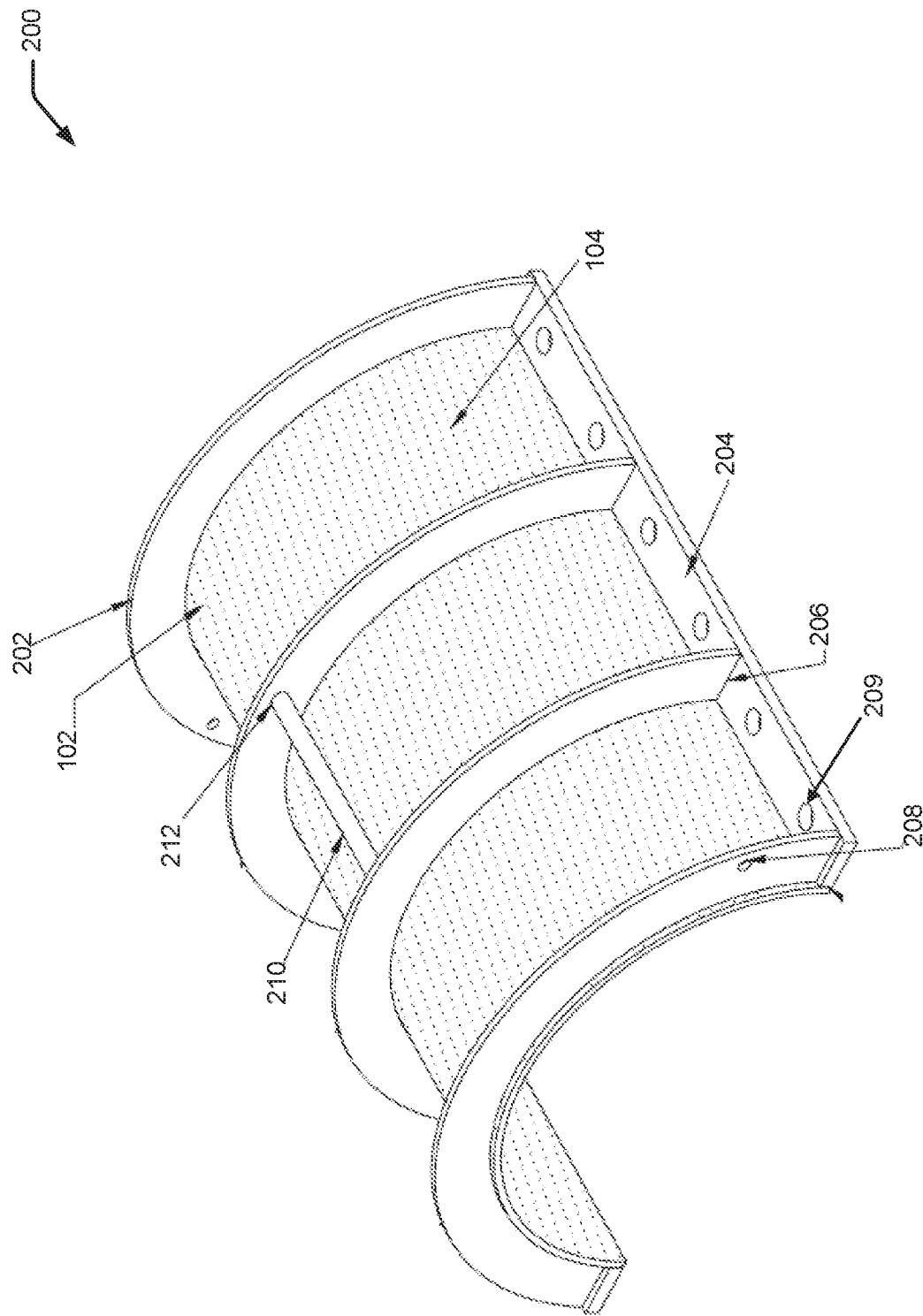
FIG. 2 illustrates an isometric view example of a screen design with a screen having a plurality of openings for a mechanical separation device.

FIG. 2 illustrates an isometric view example of a screen design 200 with a screen 102 for a mechanical separation device in a process. The screen 102 is formed of a plurality of openings 104, which may be available in different geometric shapes for any mechanical separation device. For instance, the screen design 200 may be used with the apparatus 100 in FIG. 1.

FIG. 2 illustrates the screen design 200 with a top frame 202 and a base frame 204 to provide support to the screen 102. The screen design 200 may include, but is not limited to, two to six top frames, which may be in the form of a semi-circular shape, half-moon, and the like. The screen design 200 illustrates the top frame 202 is connected to the base frame 204 at 206, which may be by joined by welding. Options include using nuts, washers, and bolts to join the top frame 202 with the base frame 204 are possible. The screen design 200 illustrates a bolt opening 208 located on the top frame 202 along with several bolt openings 209 located on the base frame 204 to prevent rotation of the screen design 200 from occurring as well as used to mount the screen design 200 onto a mechanical separation device. The top frame 202 may include, but is not limited to, one to four bolt openings located on the front of it. The base frame 204 may include, but is not limited to, three to eight bolt openings.

FIG. 2 further illustrates at least one bar handle 210 or a bar grip, which is designed for ease of lifting the screen design 200 on and off a mechanical separation device for cleaning any equipment, for replacing screens, and for portability. The bar handle 210 may be welded to the top frame 202 at 212. The screen design 200 may include, but is not limited to, one to four bar handles. In other embodiments, the screen design may not include a bar handle at all.

The screen design 200 may be divided into one to four separate sections. In an embodiment, the screen design 200 may have three sections, where each section has its own bar handle. In another embodiment, the screen design 200 may have three sections, where the two end sections each have their own bar handles, while the middle section does not have a bar handle. The bar handle 210 may be shaped as a cylindrical rod, ranging in size from about 10 mm to about 22 mm in thickness.

Figure 3:
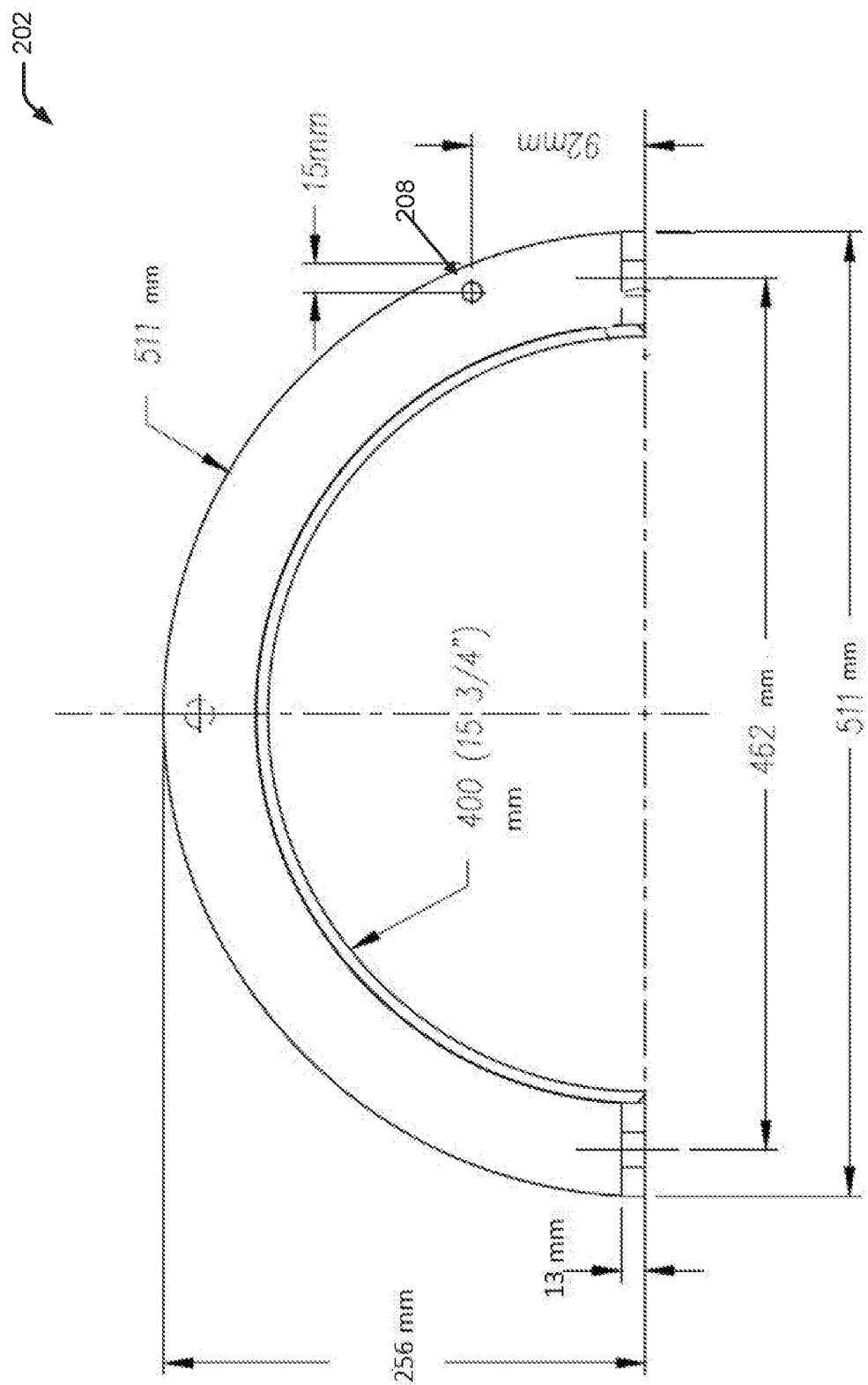
FIG. 3 illustrates a profile view example of a top frame for the screen design.

FIG. 3 illustrates a profile view example of the top frame 202 for the screen design 200. This is just one embodiment of a profile view for the top frame 202, which shows a semi-circular shape. In an embodiment, the top frame 202 has an outer circumference of approximately 511 mm, an inner circumference of approximately 400 mm, a height of 256 mm, and the center of the bolt opening 208 is located approximately 15 mm from the edge. The bolt opening 208 is located about 92 mm above a bottom of the top frame 202. The top frame 202 may have an outer circumference, which includes, but is not limited to, ranging from approximately 490 mm to about 555 mm. The inner circumference and height will be proportional based on a semi-circular shape for the top frame 202. The inner circumference is about 400 mm, while the middle circumference shows about 462 mm. FIG. 3 merely represents dimensions as an example of a top frame.

FIG. 4a illustrates an elevation view example of the screen design 400 for a mechanical separation device for a process. In an embodiment, the screen design 400 may show three sections for the screens 102 ranging in dimensions of a width of 191 mm, 200 mm, and 191 mm with ribs located between each of the sections. The ribs provide support for the screen. In other embodiments, there may be one to five sections. The screen design 400 shows an example of the bar handle 210, which is about 16 mm in diameter.

In embodiments, the screen design 400 may include the plurality of openings 104 formed in one continuous sheet of material or formed in separate sheets of material. The screen 102 may be made of, but is not limited to materials of, stainless steel, steel, steel with a coating, steel foil, aluminum, ceramic, chrome, and the like.

The plurality of openings 104 in the screen 102 may have geometric shapes that include, but is not limited to, circle, oval, square, triangle, rectangle, ellipse, and the like. The plurality of openings 104 may be of a conical shape, where the entry to the opening is larger than the discharge end or vice versa, where the entry is smaller than the discharge end. For instance, the conical shape may range from about 1 to 3 mm entry and discharge of about 2 to 4 mm. In an embodiment, the conical shape is 2 mm entry and 1 mm discharge. The angle of the opening may range from about 80 degrees to approximately 92 degrees to the surface of the screen 102.

The plurality of openings 104 in the screen 102 may vary in size depending on the specific application and on the type of material being filtered. For example, for fiber filtration, it is contemplated that the openings in the first and second screen sections 102A, 102B may be sized from about 10 microns (0.01 mm) to about 2000 microns (2 mm). In another example, the openings 104 may be from about 800 microns to about 1400 microns (about 0.8 mm to about 1.4 mm). The openings 104 in the first screen section 102A may be the same size as the openings in second screen section 102B, larger than the openings in the second screen section 102B, or smaller than the openings in the second screen section 102B. The size of the openings 104 will be determined based on size and shape of the desired material to be separated. The screens 102A, 102B can be provided with smaller openings due to the overall length. In certain applications, increasing the length of the screens 102A, 102B allows for smaller openings, which provides for a more desirable dewatering of the materials through the apparatus 100. Smaller openings also can limit the amount of solids passing through the screens 102A, 102B while still providing for desirable recovery of liquid medium and output of dry material, e.g., fiber.

In yet other embodiments, the screen 102 may have a possibility of multiple different sizes for the plurality of openings 104. For example, the plurality of openings may range from smaller to larger sizes, such as sizes from about 1000 microns in a FIRST section, about 1100 microns in a SECOND section, and about 1200 microns in a THIRD section. In another embodiment, the plurality of openings may range from larger to smaller sizes, such as sizes from about 1200 microns in a FIRST section, about 1100 microns in a SECOND section, and about 1000 microns in a THIRD section. In other embodiments, two sections may have similar plurality of opening sizes, while another section has a smaller or a larger plurality of opening size than the other two sections. Any types of possibilities of multiple different sizes for the plurality of openings are possible.

The amount of an open area in the screen 400 can range from about 15% to about 35%. In embodiments, the amount of open area in the screen 400 may be approximately 23%, approximately 27%, or approximately 29%. In an embodiment, the amount of open area in the first screen section 102A may be the same amount of open area as in the second screen section 102B. In another embodiment, the amount of open area in the first screen section 102A may have a greater amount of open area than in the second screen section 102B. In yet another embodiment, the amount of open area in the first screen section 102A may have a smaller percentage of open area than in the second screen section 102B. The amount of open area will be dependent on the filtration of the desired material.

The wall thickness between each of the plurality of openings 104 for the screen design 400 may range from about 300 microns to about 700 microns (about 0.3 mm to about 0.7 mm). In embodiments, the wall thickness in the screen design 400 may be approximately 0.4 mm, 0.5 mm, or 0.6 mm. The wall thickness in the first screen section 102A may be the same wall thickness as in second screen section 102B, or it could have a larger wall thickness than in the second screen section 102B, or yet, it could have a smaller wall thickness than in the second screen section 102B. All of these variations as described above, are possible when forming the screen design.

FIG. 4b illustrates a plan view example of a screen design 410 for the mechanical separation device for the process. The screen design 410 shows the base frame 204 with the bolt openings 209. In an embodiment, the screen design 410 may have dimensions of a width of 620 mm and a length of 511 mm. The screen 410 shows the bolt openings 209 on the base frame 204 are approximately 19 mm in size.

FIG. 5a illustrates a profile view example of another screen design 500 for a mechanical separation device. The screen design does not have a frame or a rib. This is just one embodiment of a profile view for screen design 500, which shows a semi-circular shape. In an embodiment, screen 502 has a circumference of approximately 633 mm, an inner circumference of approximately 413 mm, and a height of 199 mm. FIG. 5a merely represents dimensions as an example of the screen design 500.

FIG. 5b illustrates an elevation view example of another screen design 510 for a mechanical separation device. In an embodiment, the screen design 510 is a single screen 512.

There are no ribs to form three screens into different sections. The screen 512 may range from about 592 mm in outer length with beveled edge around the screen for overlapping or mounting with another screen. The overlap, underlap, or mounting enables the materials to separate without being trapped in the closures or attachments between the screens. The screen 512 may have an inner length of about 567 mm. The screen 512 has a plurality of openings 514, which may be based on the characteristics as discussed above. For example, having plurality of opening sizes, geometric shapes, and open spaces as discussed above.

Flinger Designs

Figure 6:
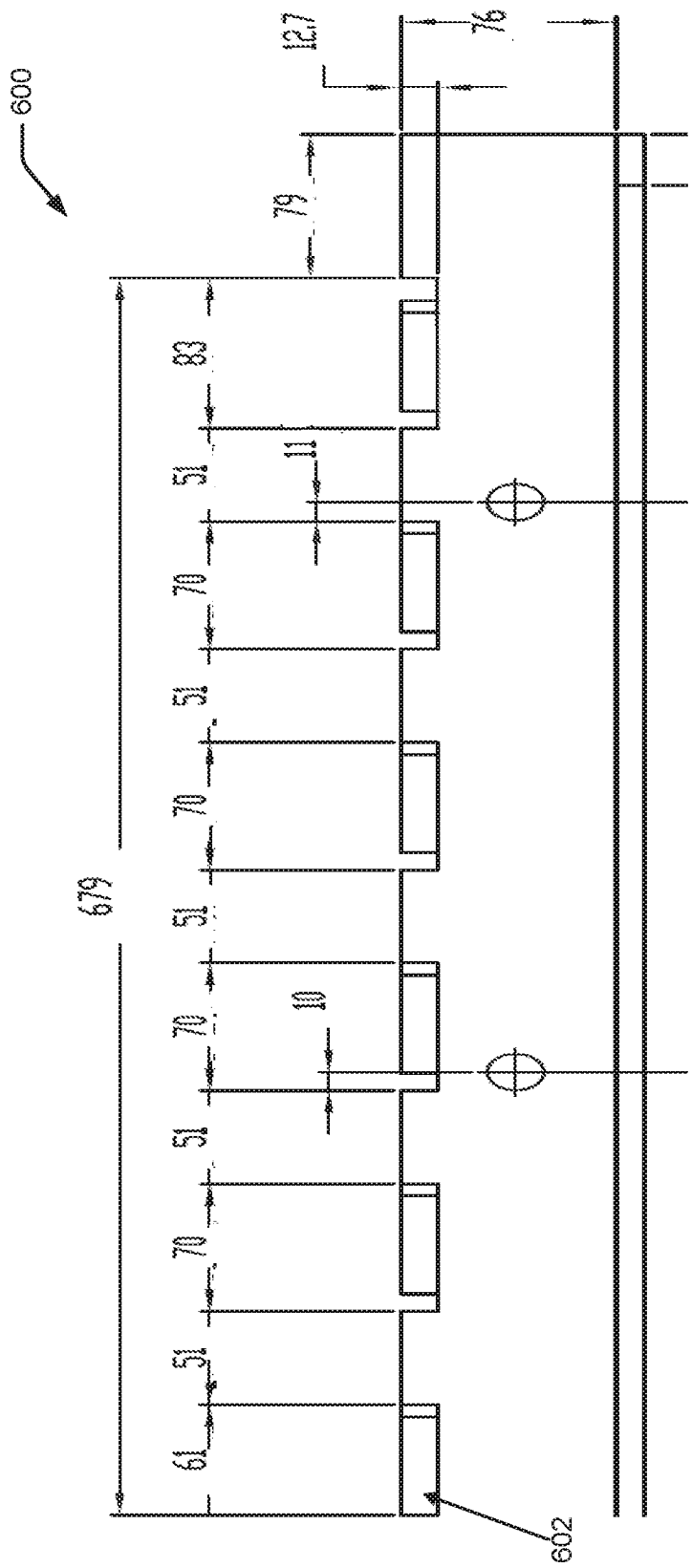
FIG. 6 illustrates an example elevation view of a paddle having a plurality of flingers for a mechanical separation device.

FIG. 6 illustrates an example elevation view of a paddle 600 with a plurality of flingers 602 for a mechanical separation device. The number of flingers 602 can range from about two to about 12. In other examples, the number of flingers 602 can be from about four to about eight. In yet another example, the number of flingers 602 is seven.

The flingers 602 may be located on top of the paddle 600 and close to one end of the paddle 600. The flinger 602 is positioned close to the screen, with a small gap ranging from about 1/16 inch to about 3/8 inch.

FIG. 6 illustrates an embodiment of an end portion of a paddle 600 with six flingers 602 that may be in length of about 59.5 mm and a depth of 12.7 mm, which are evenly spaced 51 mm apart from each other. Here, the flingers are shown as rectangle shape based on the elevation view. The spacing between each of the flingers 602 may range from about 41 mm to about 61 mm. The spacing between the flingers 602 may be constant or variable from one flinger 602 to the next.

Figure 7:
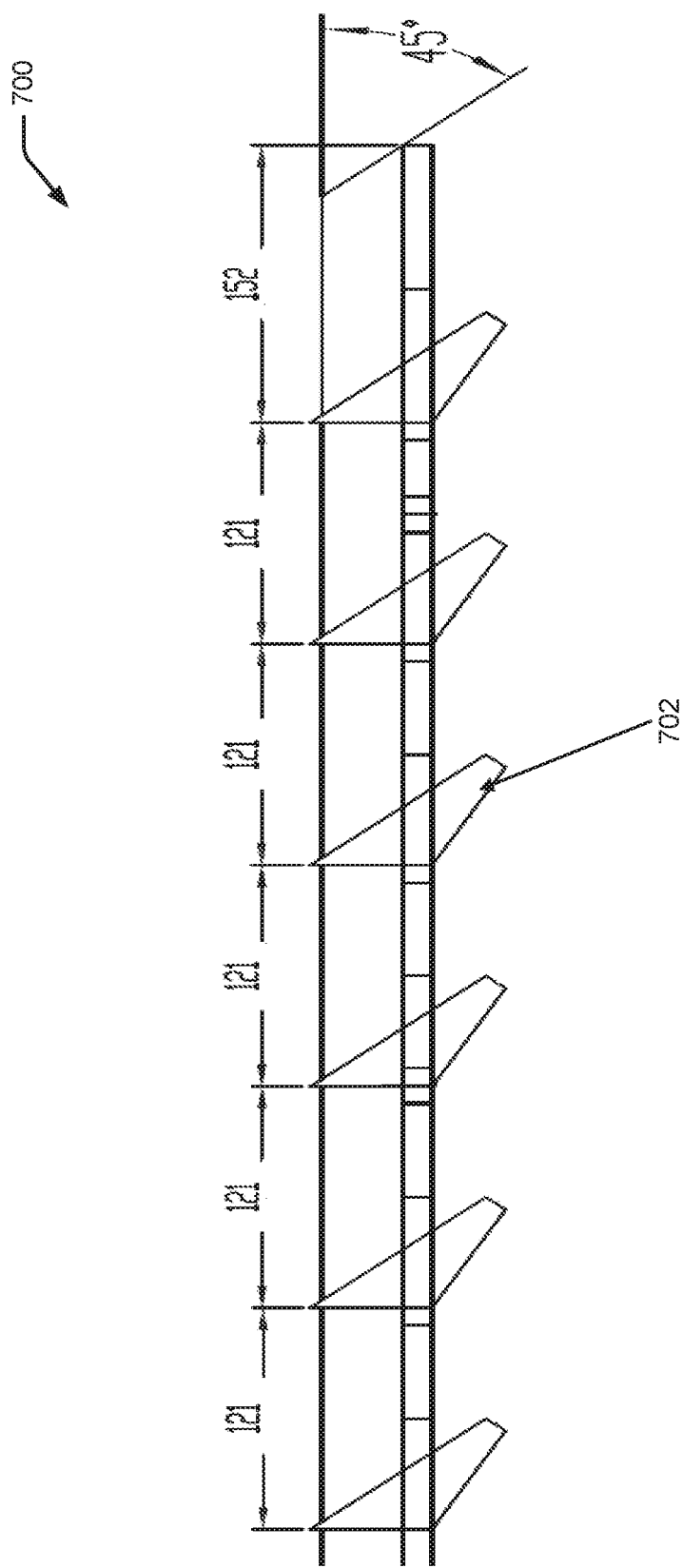
FIG. 7 illustrates another example elevation view of a paddle having a plurality of flingers for a mechanical separation device.

FIG. 7 illustrates another example elevation view of a paddle 700 having a plurality of flingers for a mechanical separation device. The paddle 700 shows one or more flingers 702, of individual triangular segments that are located near the end of the paddle. One or more flingers 702 may be angled or configured to help push the solid materials towards a discharge chute. In one example, the number of flinger 702 can range from about 2 to about 12. The number of flingers 702 and paddles can be modified depending on the amount of solids in the feed.

In another example, the pitch or angle of the flingers 702 relative to the shaft may be adjusted, as well as the spacing between the flingers 702, which can be constant or variable from one flinger to the next. Shown is a 45 degree angle of the flingers 702 relative to the paddle. The angle of the flingers may include, but is not limited to, be about 35 degrees to about 55 degrees.

In an embodiment, the spaced apart flingers 702 also extend in a direction away from a shaft, such that an outer edge of each is situated in spaced apart relation to the first screen section 102A so as to provide a gap to provide a fluid flow passage for the liquid medium (e.g., slurry and/or wash water) during the filtration of the material (e.g., fiber), and can be sized to accommodate the design throughput of the apparatus 100. The space between adjacent flingers also defines an open cavity and similarly provides a fiber flow passage for the solids medium during the filtration of the material, and likewise can be sized to accommodate the design throughput of the apparatus 100.

Figure 8:
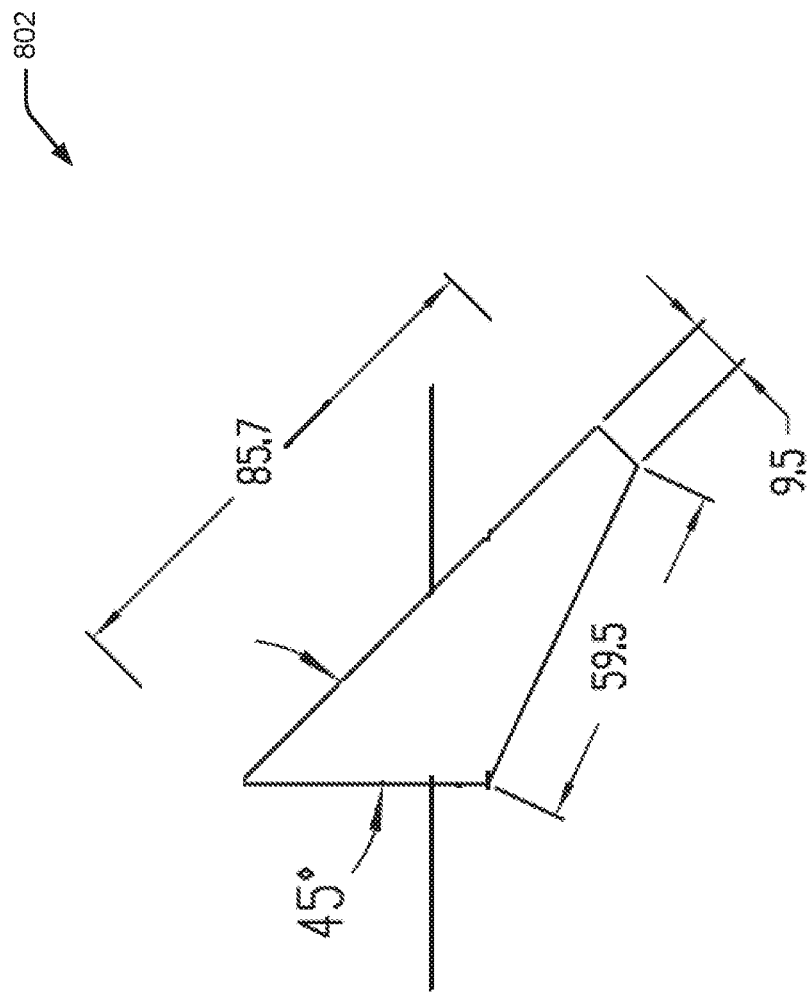
FIG. 8 illustrates an example elevation view of a flinger for a paddle.

FIG. 8 illustrates an example elevation view of a flinger 802 on the paddle for use in a mechanical separation device. The flinger 802 may have shapes that include, but is not limited to, triangle, rectangle, airfoil, and the like. The thickness of the flinger 802 can range from about 8 mm to 18 mm. In another example, the thickness of the flinger may be approximately 12.7 mm. The shape and orientation of the flinger may be changed as desired to adjust the flow of the material and liquid medium and the filtering characteristic of the apparatus 100. In one example, the flinger 802 may be oriented in a helical fashion about the length of the conveyor of a shaft. As mentioned, the flinger 802 may be positioned at 45 degree angle relative to the paddle. The flinger 802 may have a weight ranging from about 0.2 to about 0.8 pounds. In an embodiment, the flinger 502 is 0.5 pounds in weight.

The paddle includes the flingers 802, which has a chamfer. The chamfer represents a rotating assembly of 2.46 mm on a leading edge and 2.84 mm on a lagging edge for assurance that the flingers 802 and bar can be placed as close to the screen as possible without rubbing the screen. In an embodiment, the chamfer may include angles of about 94.23 degrees on the leading edge and 96.25 degrees on the lagging edge to allow assurance that the flingers 802 and bar can be placed as close to the screen as possible without rubbing the screen. In another embodiment, the chamfer may include angles from about 90 degrees leading edge to about 98 degrees on lagging edge. For instance, the flingers 802 may be used with the apparatus 100 in FIG. 1.

There is less wear on the paddle screen and the screen, as a result of these design improvements. Thus, there are savings in capital and operating costs with these new improvements for mechanical separation devices.

Example Environment

Figure 9:
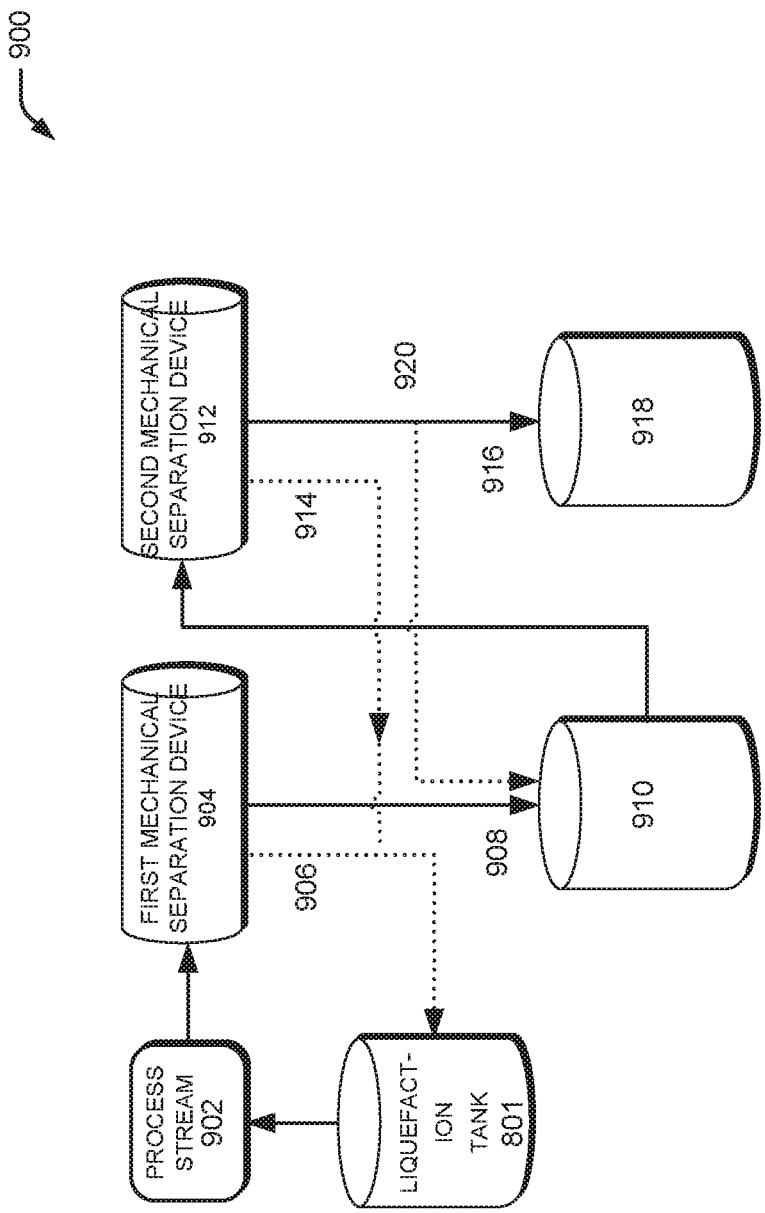
FIG. 9 illustrates an example of an environment for a process using a mechanical separation device with the screen designs and flinger designs.

FIG. 9 illustrates an example of an environment of a process 900 that may use a mechanical separation device with the new screen designs and new flinger designs. The process 900 illustrates an example using a counter-flow wash process. For illustrative purposes, the liquids are identified by dotted lines to indicate being sent to a tank. These examples illustrate streams that may be sent from the mechanical separation devices and streams received into the tanks from the different mechanical separation devices. However, the liquids stream may be sent to water make up process, a receiving tank, a slurry tank, a liquefaction tank, a remix tank, and the like, while any streams may be received into the tanks from any of the mechanical separation devices. The terms, such as large-particles, larger-size particles, and solids are used to describe the materials separated by the mechanical separation devices. These tend to be considered of solids content and includes larger size particles than the liquids with small particles, which are liquids content and include smaller size particles than the solids, which will be referred to as liquids stream.

The process 900 receives a process stream 902, which may be a slurry from a slurry tank prior to being cooked or from a liquefaction tank 901. The process 900 separates the components, and further washes the material. The process 900 sends the process stream 902 through a first mechanical separation device 904, which separates components such as the larger solid particles from the smaller particles and liquids stream a first time. This is also referred to as a first pass. The first tank 910 may contain about 40% solids content (average).

The first mechanical separation device 904 includes paddles with flingers 802 that rotate, a stationary drum, and an outer wall configured as the screen 102 with a plurality of openings 104. In an embodiment, the paddle may include six flingers 802, that are of similar size as shown in FIG. 8 and spaced apart as shown in FIGS. 6 and 7.

The first mechanical separation device 904 pushes the process stream 902 against the screen 102 with the plurality of openings 104 where the liquids and small particles (i.e., starch, gluten, protein, salt, and the like) pass through the screen 102 and are sent to a water makeup process, which makes the process stream 902 (as shown by the dotted line). The paddles with the flingers 802 rotate to move the process stream 902 toward the screen 102, 200. The screen 102 has plurality of openings 104 that are sized to allow water, starch, and smaller sized particles to flow through the openings 104, but will not allow the larger particles, such as fiber to flow through. In this embodiment, the screen 102, 200 may have a plurality of openings 104 that may have a diameter of about 1.2 mm in size with about 28% open area on stainless steel material.

The process 900 produces a liquids stream 906 and a solids stream 908. The liquids stream 906 may include starch that has been washed and removed from the fiber. However, the solids stream 908 may still contain starch and/or the food grade protein. Thus, the process 900 may wash the fiber through a series of mechanical separation devices.

The process 900 directs the liquids stream 906 to a liquefaction tank 801 and sends the solids stream 908 to a first tank 910. The first tank 910 receives another liquids stream 920 of clean water. Here, the combined streams are mixed and heated to about 76° C. to about 85° C. (170° F. to about 185° F., about 349 K to about 358 K) for about 1 to about 60 minutes. In an embodiment, the combined streams are mixed and heated to about 82° C. (about 180° F., about 355 K) for about 5 minutes. The process 900 sends this combined stream from the first tank 910 to a second mechanical separation device 912.

The second mechanical separation device 912 washes and removes the starch from the fiber, producing another liquids stream 914 to be sent to a water makeup process, which makes the process stream 902 (as shown by the dotted line), or alternatively, to liquefaction tank 801, to makeup water for slurry tank, and another solids stream 916 to be sent to the second tank 918. The process 900 sends the combined stream from the first tank 910 through the second mechanical separation device 912, which separates components such as the solid particles from the smaller particles and liquids stream a second time, or referred to as a second pass. The second tank 918 may contain about 40% solids content (average).

The screen designs and/or the flinger designs may be incorporated in mechanical separation device(s), such as multi-zoned screening apparatus or paddle screen to be used in processes as described in U.S. patent application Ser. No. 14/073,046, entitled "Advanced Cook Technology," filed on Nov. 6, 2013; U.S. patent application Ser. No. 14/028,020, entitled "Hybrid Separation," filed on Sep. 16, 2013, now issued as U.S. Pat. No. 9,376,504; U.S. patent application Ser. No. 15/187,563, entitled "Hybrid Separation", filed on Jun. 20, 2016, and in U.S. patent application Ser. No. 14/557,175, entitled "Optimized Dewatering Process for an Agricultural Production Facility," filed on Dec. 1, 2014; the contents of which are hereby incorporated by references in their entireties.

Experimental Test Results

Experimental evaluations of the screen designs and flingers were conducted to determine separation efficiencies and visible wear. The mechanical separation device was operated with a wedge wire screen, which served as a control. The evaluations include using the new screen designs with circular holes having a diameter of about 1.2 mm in size with about 22.7% open space formed on stainless steel and using the paddle designs with seven flingers. The operational differences noted from the experimental evaluations are shown below

TABLE 1

Operational Differences for Pass 1

| Differences | Wedge Wire Screen | Plurality of Openings Screen with 7 Flingers |
| --- | --- | --- |
| % Solids with number of Separation Device | 40-45% possible with two separation devices | 40-45% possible with one separation device |
| % speed of Separation Device Used | 100% | 75% |
| Wear Noticed | Yes, visible wear | No visible wear |
| Dewatering on Screens | ⅔ of screen used | Entire screen used |

It appears that the separation was efficient using the new screen design and the new flinger design on the paddle screen. As noted above, the same amount of solids was achieved using one separation device, instead of two separation devices as with the wedge wire screen. The wedge wire screen showed visible wear while the screen with the plurality of openings did not exhibit visible wear. Another experiments conducted using six flingers, which showed the speed of the separation device could be further reduced, using only 65% to 70%.

The new screen designs show less visible wear which is an advantage, to save money on having to purchase new screens due to premature wear. Also, a plant does not have to shut down to replace the screens or to clean the screens due to fouling. This disclosure helps to reduce an amount of energy used for processing, which in turn reduces gas house gas (GHG) emissions or carbon-intensity (CI), and reduce operating costs and/or reduce capital costs, which in turn may lower biofuel production costs.

Two types of samples have been collected and analyzed in the laboratory to determine the total starch percentage. One sample is with milo as feedstock while the other sample is with corn as feedstock.

TABLE 2

Lab Data

| | Wedge Wire Screen (typical) | Plurality of Openings Screen with 7 Flingers | Plurality of Openings Screen with 7 Flingers |
| --- | --- | --- | --- |
| Total Starch (Validase) (%) | 6 | 1.9 | 1.7 |
| Feedstock | Corn | Milo | Corn |

The data in Table 2 indicate using the new screen designs with the plurality of openings and the flingers on the paddle in the mechanical separation device have reduced the amount of total starch significantly, compared to using a wedge wire screen Without any flingers on the paddle. This is indicative of how efficient the new screens with the plurality of openings are helping to separate the solid particles out, such as fiber.

Those of ordinary skill in the art will recognize how to modify or configure the apparatus 100 so as to effectively operate in these other industries. Thus, the various features of the invention may be used alone or in numerous combinations depending on the needs and preferences of the user.

What is claimed is:

1. A mechanical separation device comprising:
a housing with a teed inlet at a first end section of the housing and a discharge outlet at a second end section of the housing, the feed inlet configured to receive a slurry comprising solids within a liquid medium;
a screen comprising:
a plurality of openings formed on a sheet of metal material, wherein each opening of the plurality of openings comprises a uniform diameter of about 0.8 mm to about 1.5 mm in size;
wherein the plurality of openings comprise a geometric shape of a circle for each opening on the sheet of metal material;
wherein the screen is configured to separate at least a portion of the liquid medium from the solids; and
a bar handle to lift the screen on and off the mechanical separation device; and
a conveyor assembly within the housing, the conveyor assembly having a shaft, a plurality of paddles and a plurality of flingers, wherein the plurality of paddles extend radially from the shaft and the plurality of flingers are mounted to one or more of the plurality of paddles at an outer radial end portion thereof, and wherein the plurality of flingers are configured to move the solids and the liquid medium along an axial length of the housing toward the discharge outlet.

2. The mechanical separation device of claim 1, wherein collectively the plurality of openings define an opened area of about 20% to about 35% formed on the sheet of metal material.

3. The mechanical separation device of claim 1, wherein the sheet of metal material comprises at least one of stainless steel, steel with a coating, steel foil, aluminum, or chrome.

4. The mechanical separation device of claim 1, wherein the bar handle comprises a shape of a cylindrical rod.

5. The mechanical separation device of claim 1, wherein the bar handle ranges in size comprising about 10 mm to about 22 mm in thickness.

6. The mechanical separation device of claim 1, wherein a profile view of the screen is a semi-circular shape having an outer circumference ranging from about 490 mm to about 555 mm.

7. The mechanical separation device of claim 1, wherein the screen comprises three different sections, wherein a first section is about 191 mm in width, a second section is about 210 mm in width, and a third section is about 191 mm in width.

8. A mechanical separation device comprising:
a housing with a feed inlet at a first end section of the housing and a discharge outlet at a second end section of the housing, the feed inlet configured to receive a slurry comprising solids within a liquid medium;
a screen positioned within the housing to separate at least a portion of the liquid medium from the solids; and
a conveyor assembly within the housing, the conveyor assembly having a plurality of flingers mounted to a plurality of paddles, wherein the plurality of flingers are positioned adjacent the screen, each of the plurality of flingers are spaced apart from one another and have a triangular shape, wherein the plurality of fingers are configured to move the solids and the liquid medium along an axial length of the housing toward the discharge outlet.

9. The mechanical separation device of claim 8, wherein the plurality of paddles extend radially from a shaft, and wherein the plurality of flingers are mounted to one or more of the plurality of paddles.

10. The mechanical separation device of claim 9, wherein each of the plurality of flingers forms an angle of between about 42 degrees to about 48 degrees relative to the one or more of the plurality of paddles.

11. The mechanical separation device of claim 8, wherein the triangular shape comprises about 84 mm to about 87 mm of length on a first side, about 8 mm to about 12 mm of length on a second side, and about 10 mm to about 13 mm of length on a third side.

12. The mechanical separation device of claim 8, wherein the screen is formed of a sheet of metal material and has a plurality of circular openings therethrough.

13. The mechanical separation device of claim 12, wherein the plurality of openings have a diameter of about 0.8 mm to about 2.0 mm in size.

14. The mechanical separation device of claim 12, wherein the screen includes a bar handle to facilitate lifting the screen on and off the mechanical separation device.

15. The mechanical separation device of claim 12, wherein collectively the plurality of circular openings define an opened area of about 20% to about 35% formed on the sheet of metal material.

16. A mechanical separation device comprising:
a housing with a feed inlet at a first end section of the housing and a discharge outlet at a second end section of the housing, the feed inlet configured to receive a slurry comprising solids within a liquid medium;
a screen positioned within the housing to separate at least a portion of the liquid medium from the solids, wherein the screen is formed of a sheet of metal material and has a plurality of circular openings therethrough, and wherein the plurality of openings each have a diameter of about 0.8 mm to about 2.0 mm in size; and
a conveyor assembly within the housing, the conveyor assembly having a shaft, a plurality of paddles and a plurality of flingers, wherein the plurality of paddles extend radially from the shaft and the plurality of flingers are mounted to one or more of the plurality of paddles, and wherein the plurality of flingers are configured to move the solids and the liquid medium along an axial length of the housing toward the discharge outlet.

17. The mechanical separation device of claim 16, wherein each of the plurality of flingers has one of a triangular shape, a rectangular shape or an airfoil shape.

18. The mechanical separation device of claim 16, wherein the screen includes a bar handle to facilitate lifting the screen on and off the mechanical separation device.

19. The mechanical separation device of claim 1, wherein each of the plurality of flingers has one of a triangular shape, a rectangular shape or an airfoil shape.

* * * * *

UNITED STATES PATENT AND TRADEMARK OFFICE
CERTIFICATE OF CORRECTION

PATENT NO. : 11,103,811 B2  Page 1 of 1
APPLICATION NO. : 15/796446
DATED : August 31, 2021
INVENTOR(S) : Charles C. Gallop It is certified that error appears in the above-identified patent and that said Letters Patent is hereby corrected as shown below:

In the Claims

In Column 19, Line 3, in Claim 1, delete "teed" and insert --feed-- therefor

In Column 20, Line 1, in Claim 8, delete "fingers" and insert --flingers-- therefor Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*